(12) United States Patent
Dai

(10) Patent No.: US 8,451,730 B2
(45) Date of Patent: May 28, 2013

(54) APPARATUS AND METHOD FOR IMPLEMENTING MULTIPLE HIGH SPEED SWITCHING FABRICS IN AN ETHERNET RING TOPOLOGY

(75) Inventor: William Dai, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 470 days.

(21) Appl. No.: 11/396,618

(22) Filed: Apr. 4, 2006

(65) Prior Publication Data

US 2007/0171917 A1    Jul. 26, 2007

Related U.S. Application Data

(60) Provisional application No. 60/762,111, filed on Jan. 26, 2006.

(51) Int. Cl.
*G01R 31/08* (2006.01)

(52) U.S. Cl.
USPC ........... 370/235; 370/394; 370/401; 370/473; 370/474

(58) Field of Classification Search
USPC ............................. 370/395.53, 229–240, 389
See application file for complete search history.

(56) References Cited

U.S. PATENT DOCUMENTS

| | | | |
|---|---|---|---|
| 5,781,549 A * | 7/1998 | Dai | 370/398 |
| 6,275,499 B1 | 8/2001 | Wynn et al. | |
| 6,308,228 B1 | 10/2001 | Yocum et al. | |
| 6,793,539 B1 | 9/2004 | Lee et al. | |
| 7,027,457 B1 | 4/2006 | Chiussi et al. | |
| 7,126,955 B2 | 10/2006 | Nabhan et al. | |
| 7,277,443 B2 * | 10/2007 | Goode et al. | 370/400 |
| 7,385,918 B2 * | 6/2008 | Takagi | 370/222 |
| 8,098,676 B2 * | 1/2012 | Connor | 370/419 |
| 2004/0030816 A1 * | 2/2004 | Knight et al. | 710/52 |
| 2005/0135398 A1 | 6/2005 | Muthukrishnan et al. | |
| 2005/0157729 A1 * | 7/2005 | Rabie et al. | 370/395.53 |
| 2005/0281282 A1 | 12/2005 | Gonzalez et al. | |
| 2006/0034310 A1 * | 2/2006 | Connor | 370/419 |
| 2006/0101159 A1 | 5/2006 | Yeh et al. | |
| 2007/0053294 A1 * | 3/2007 | Ho et al. | 370/235 |

OTHER PUBLICATIONS

"Non-Final Office Action received for U.S. Appl. No. 11/396,619, mailed on Oct. 8, 2008", 18 pages.
"Final Office Action received for U.S. Appl. No. 11/396,619, mailed on Apr. 7, 2009", 18 pages.
"Non-Final Office Action received for U.S. Appl. No. 11/369,619, mailed on Jun. 15, 2009", 17 pages.

(Continued)

Primary Examiner — Ayaz Sheikh
Assistant Examiner — Mounir Moutaouakil

(57) ABSTRACT

A network device for implementing a high speed transmission protocol. The network device includes a plurality of high speed modules which are connected by a plurality of high speed links. Each of the plurality of high speed modules implements the high speed transmission protocol and each of the plurality of high speed modules being implemented in an Ethernet ring topology. A medium access control layer in each of the plurality of high speed modules is modified in a manner that is transparent to a switching entity in each of the plurality of high speed modules. The high speed transmission protocol comprises a plurality of aspects including an in-banding messaging mechanism for efficient and responsive traffic management and network operation.

19 Claims, 13 Drawing Sheets

OTHER PUBLICATIONS

"Non-Final Office Action received for U.S. Appl. No. 11/369,617, mailed on Nov. 13, 2008", 16 pages.
"Final Office Action received for U.S. Appl. No. 11/396,617, mailed on May 11, 2009", 16 pages.
Final Office Action for U.S. Appl. No. 11/396,617, mailed on Jul. 22, 2010, 18 pages.
Non Final Office Action for U.S. Appl. No. 11/396,617, mailed on Jan. 11, 2010, 19 pages.
Non Final Office Action for U.S. Appl. No. 11/396,617, mailed on Nov. 26, 2010, 17 pages.
Final Office Action for U.S. Appl. No. 11/396,619, mailed on Feb. 1, 2010, 22 pages.
U.S. Appl. No. 11/396,617 Final Office Action mailed Jun. 13, 2011, 16 Pgs.

* cited by examiner

APPARATUS AND METHOD FOR IMPLEMENTING MULTIPLE HIGH SPEED SWITCHING FABRICS IN AN ETHERNET RING TOPOLOGY

This application claims priority of U.S. Provisional Patent Application Ser. No. 60/762,111, filed on Jan. 26, 2006. The subject matter of the earlier filed application is hereby incorporated by reference.

BACKGROUND OF THE INVENTION

1. Field of the Invention

The present invention relates to a switching protocol in a packet switching network and more particularly to a system and method of providing a high speed protocol for switch devices in a packet switching network.

2. Description of the Related Art

A packet switching network/fabric may include one or more network devices, such as an Ethernet switching chip, each of which includes several modules that are used to process information that is transmitted through the device. Specifically, each network device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

One or more network devices in a switching fabric may include one or more internal fabric high speed ports, for example a HiGig™ port, in addition to one or more external Ethernet ports, and a CPU port. The high speed ports are used to interconnect various network devices in a system and thus form an internal switching fabric for transporting packets between external source ports and one or more external destination ports. As such, the high speed ports are not externally visible outside of a system that includes multiple interconnected network devices. The current high speed transmission protocols for these high speed ports, however, have become an architectural bottle neck because they do not scale well with the requirements from higher end system designs. For example, the current high speed transmission protocols support eight classes which are not enough to differentiate system control and network application traffic within the switching fabric. Current high speed transmission protocols also support up to 128 modules which is insufficient for higher end system design and expansion. In current high speed transmission protocols, the support of 4K identifiers in each of the layer 2 multicast and IP multicast space is not enough, in some cases, and the hard separation of layer 2 multicast, IP multicast and broadcast spaces makes it inflexible to re-allocate limited table resources to meet requirements from different customers' system designs. Furthermore, the design of the header structure of the current high speed transmission protocols prevents sustainable development. In addition, important information is missing. For example, missing from the current high speed transmission protocols are load balancing information which enables every port of a switching fabric to have its own packet parsing logic and a fine granular link level flow control mechanism for optimal operation required by higher end fabric designs.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
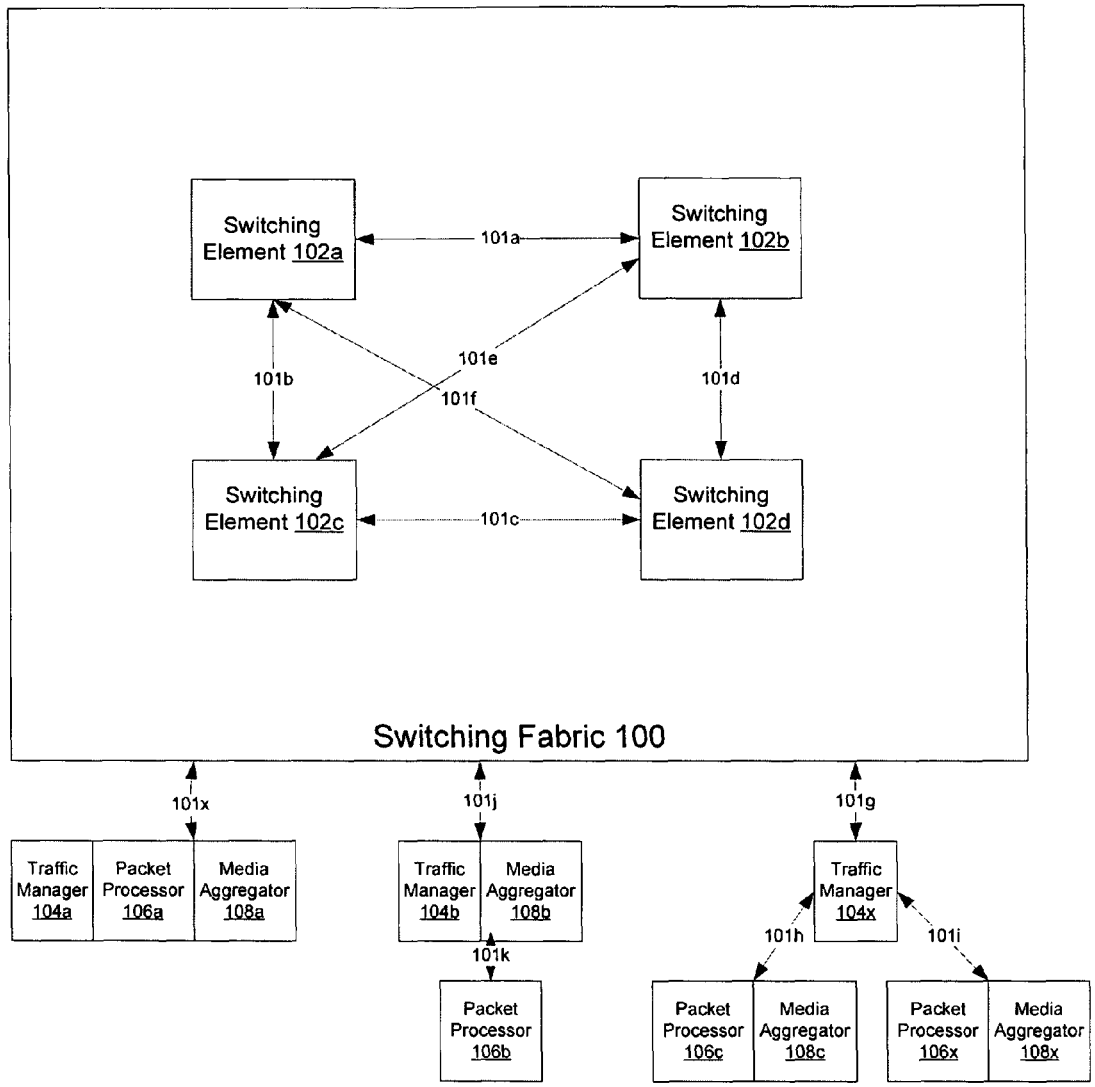
FIG. 1 illustrates a packet switching fabric 100 in which an embodiment the present invention may be implemented.

FIG. 1 illustrates a packet switching fabric 100 in which an embodiment the present invention may be implemented. Packet switching fabric 100 uses inventive high speed links 101a-101x, implementing an inventive high speed transmission protocol which is intended to form a communication and transport backbone among switching components such as, multiple switching elements 102a-102d, multiple traffic managers 104a-104x, multiple packet processors 106a-106x and multiple media aggregators 108a-108x. Each switching element 102 is a switching device/module on which packet switching fabric 100 is constructed. It should be noted that a packet switching fabric 100 may include one or more switching elements 102. Each traffic manager 104 is a functional block/module for handing packet buffering, queuing, scheduling, congestion management and flow control, as well as traffic splicing and shaping functions. Each packet processor 106 is a device for handling packet parsing, classification, layer 2/layer 3 (L2/L3) switching, as well as packet modification and replication functions. Each media aggregator 108 is a device for handling the packet transmission on the network through one or multiple ports.

In an embodiment of the invention, each of switching elements 102, traffic managers 104, packet processors 106 and media aggregators 108 may take different forms of functionality and device level integration based on the performance and cost factor(s) associated with switching fabric 100. For example, there may be a single switching element 102 in switching fabric 100. In other cases, multiple switching elements 102 may be interconnected in the form of rings or other complex multistage networks to form switching fabric 100. However, the inventive high speed transmission protocol retains its core functionality regardless of the switching elements 102, traffic managers 104, packet processors 106 and media aggregators 108 combinations.

Figure 2:
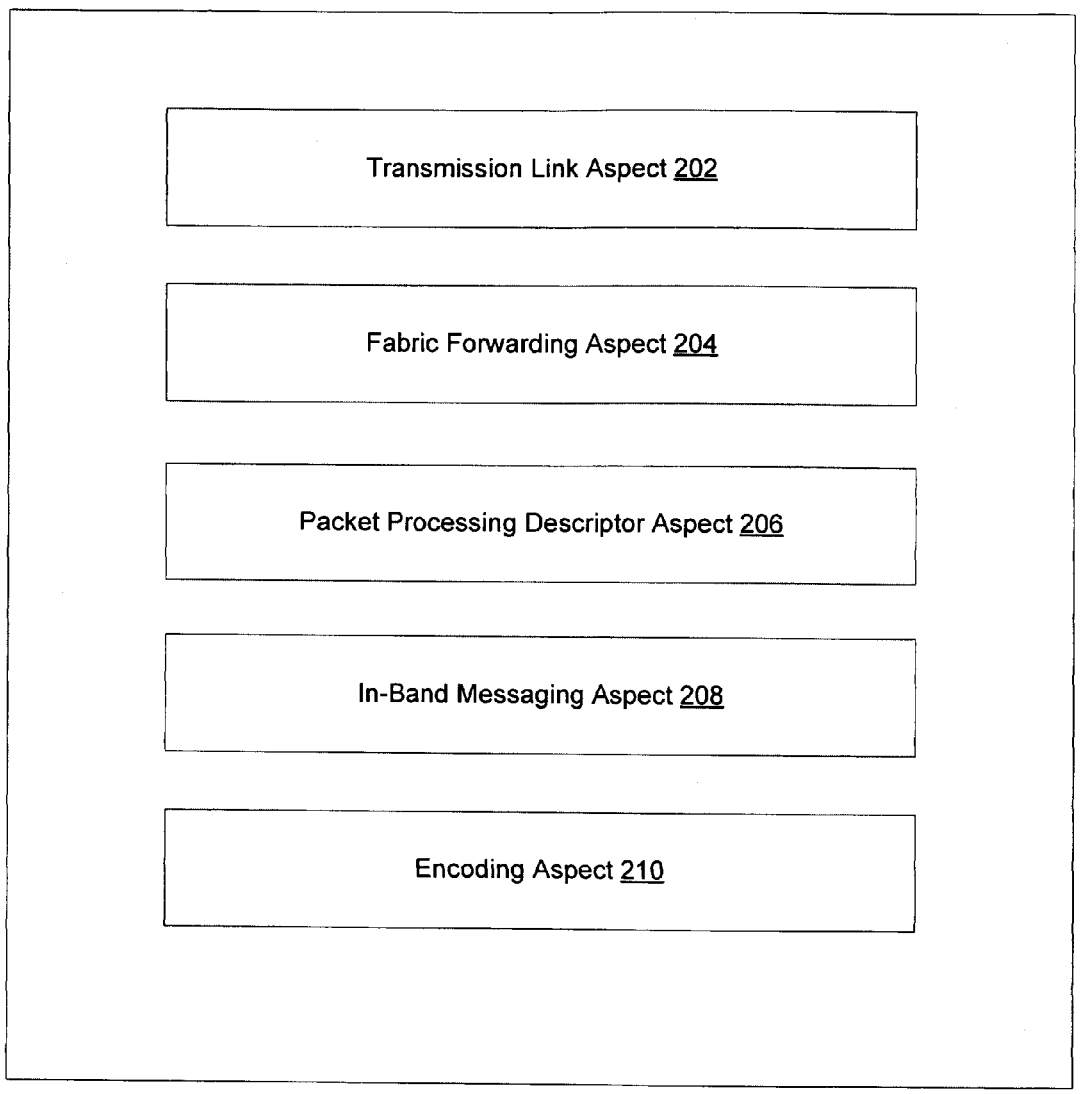
FIG. 2 illustrates aspects of the inventive speed transmission protocol.

FIG. 2 illustrates aspects of the inventive high speed transmission protocol. As shown in FIG. 2, the high speed transmission protocol provides a transmission link aspect 202, a fabric forwarding aspect 204, a packet processing descriptor aspect 206, an in-band messaging aspect 208 and an encoding aspect 210. Transmission link aspect 202 provides for variable-sized packet based transmission with fixed-sized messaging capability. Transmission link aspect 202 also provides message-over-packet pre-emptive transmission capability (discussed in detail below), and error checking capability for both packet and message transmissions. An embodiment of fabric forwarding aspect 204 supports up to 16 traffic class differentiations for packet flows across the system, supports up to 256 addressable physical/logical modules; supports generic multicast forwarding across the system with up to 64 K groups at the module level granularity and expandable at the port level; supports explicit port level indication for physical ports, physical trunks and various embodiments of virtual ports/links/channels/tunnels; and supports explicit fabric design specification operation parameters for packet-content agnostic fabric operation. Packet processing descriptor aspect 206 provides flexibility for various packet-processing descriptor adaptations, including the existing descriptors developed for current high speed protocols, and provides packet processing flow continuity across packet switching fabric 100 for system design scalability. In-band messaging aspect 208 provides congestion management protocols, system resiliency protocols, database synchronization protocols and component access protocols. Encoder aspect 210 provides structured header design for sustainable developments and is scalable with physical interface speed upgrades.

In an embodiment of switching fabric 100 implementing the current high speed transmission protocol, each component 102-108 has a port level visibility across the switching fabric. Each multicast packet sent from an ingress module of one of components 102-108 is sent once and is replicated to the corresponding set of egress modules which replicates the packet further to the corresponding set of egress port(s). Switching fabric 100 provides for two virtual forwarding planes concurrently, one for packet transport and the other for in-band messaging. Each forwarding plane guarantees in-order delivery for traffic with the same {source, destination, traffic class} tuple. An ingress switching fabric module and an egress switching fabric module forms a pair of packet processing protocol peer which uses packet processing descriptor 206 as the communication mechanism.

Figure 3:
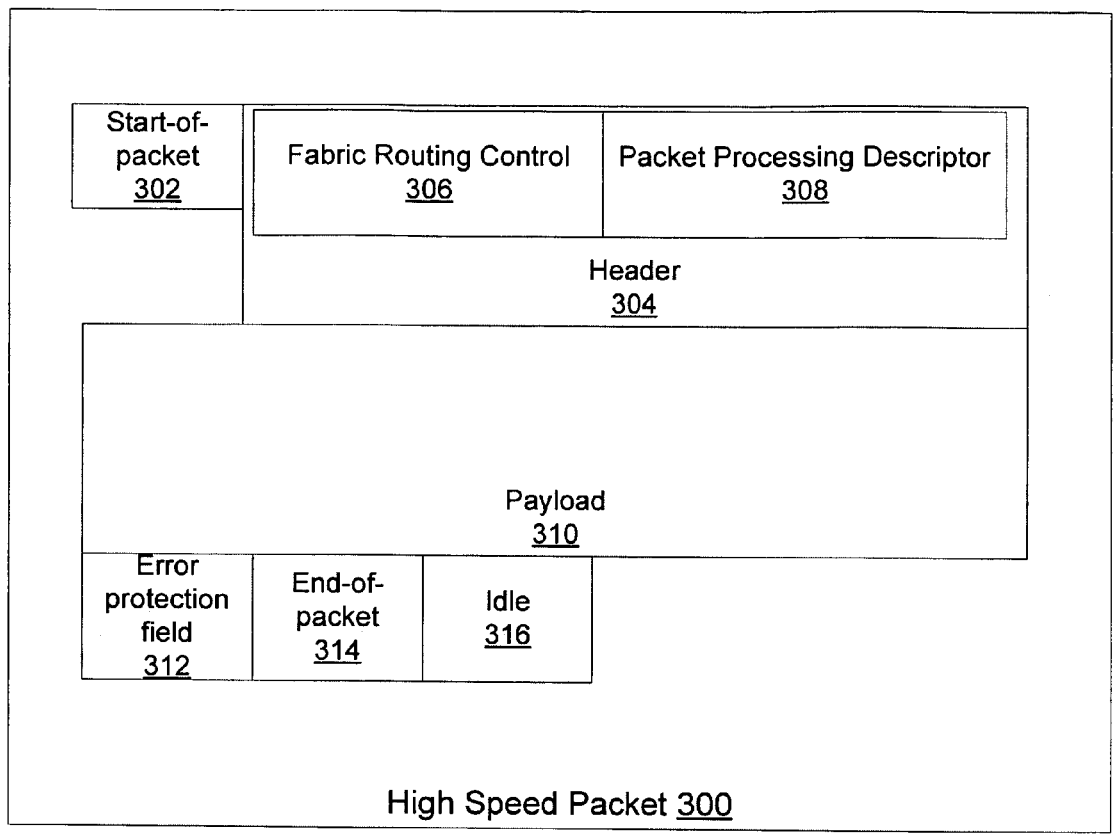
FIG. 3 illustrates an embodiment of a high speed packet 300 implementing the inventive high speed transmission protocol.

FIG. 3 illustrates an embodiment of a high speed packet 300 implementing the inventive high speed transmission protocol. Each high speed packet 300 includes a control start-of-packet character 302, a control end-of-packet character 314 which is aligned depending on a length of a high speed payload 310, and a control idle character 316 which is used to fill the gap between high speed packets and/or messages. Each high speed packet 300 also includes a 16 bit header 304 which carries transmission header information for the high speed payload 310. The header 304 includes a fabric routing control portion 306 which is used by switching fabric 100 for forwarding operations and a packet processing descriptor 308 which is used by elements of switching fabric 100 for fine grained traffic management and packet processing operations. In one embodiment, fabric routing control portion 306 is 7 bytes and packet processing descriptor 308 is 8 bytes. High speed packet 300 also includes a payload portion 310 for carrying frames, for example, Ethernet frames. High speed packet 300 further includes a packet error protection field 312.

Figure 3A:
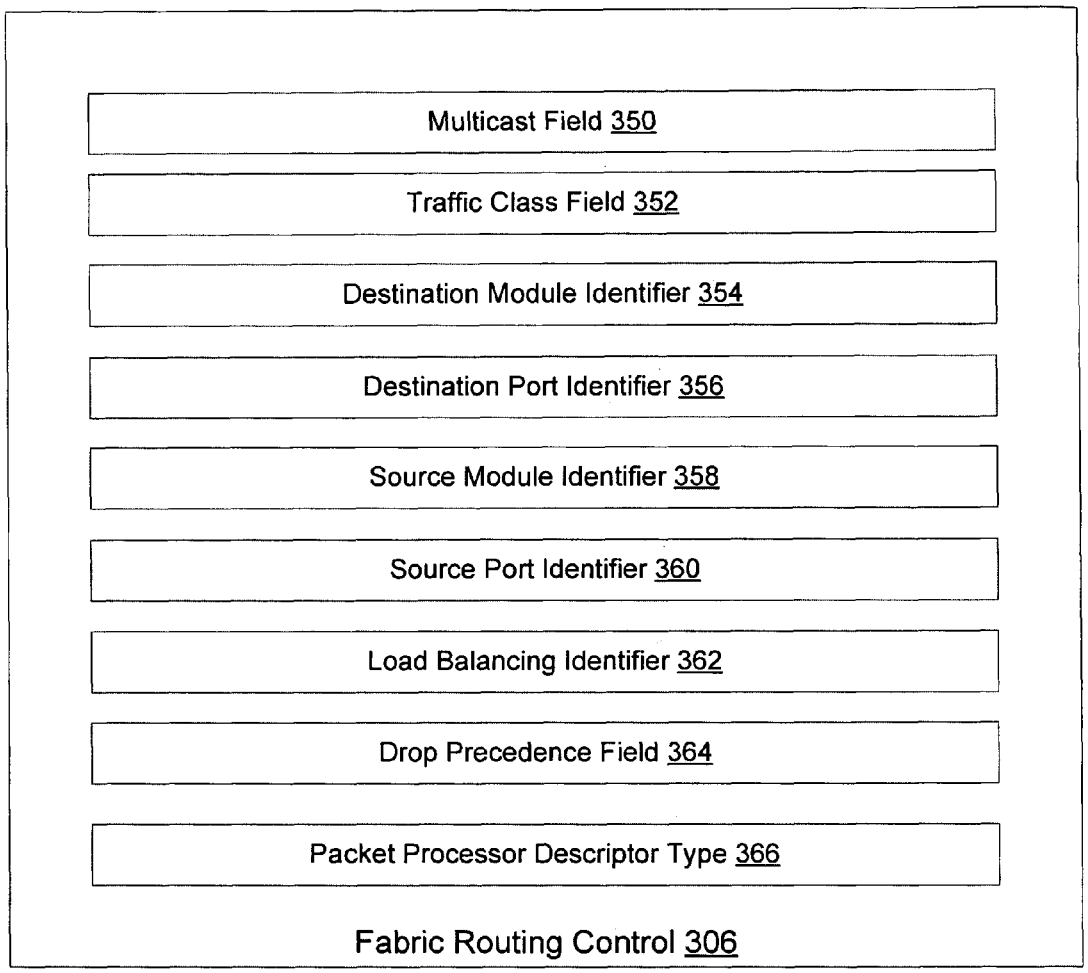
FIG. 3a further illustrates an embodiment of a fabric routing control portion.

FIG. 3*a* further illustrates an embodiment of fabric routing control portion 306. As shown, fabric routing control portion 306 includes a multicast field 350 for indicating if the packet is to be unicast or multicast through switching fabric 100, a traffic class field 352 for indicating the distinctive quality of service that switching fabric 100 will provide when forwarding the packet, a destination module identifier 354, a destination port identifier 356, a source module identifier 358, a source port identifier 360, a load balancing identifier 362 for indicating a packet flow hashing index for statistically even distribution of packet flow though the multi-path switching fabric 100, a drop precedence field 364 for indicating the traffic rate violation status of the packet as measured by the ingress module, a packet processing descriptor type 366 for defining packet processing descriptor 308, and multiple reserved fields that are placed between other fields of fabric routing control portion 306. When multicast field 350 indicates that the packet is to be unicast, destination module identifier 354 indicates the destination module to which the packet will be delivered and when multicast field 350 indicates that the packet is to be multicast, destination module identifier 354 indicates the higher order bits of the multicast group identifier. When multicast field 350 indicates that the packet is to be unicast, destination port identifier 356 indicates the physical port associated with the module indicated by destination module identifier 354 through which the packet will exit system 100 and when multicast field 350 indicates that the packet is to be multicast, destination port identifier 356 indicates the lower order bits of the multicast group identifier. Source module identifier 358 indicates the source module from which the packet originated. Source port identifier 360 indicates the physical port associated with the module indicated by source module identifier 358 through which the packet entered system 100.

Figure 3B:
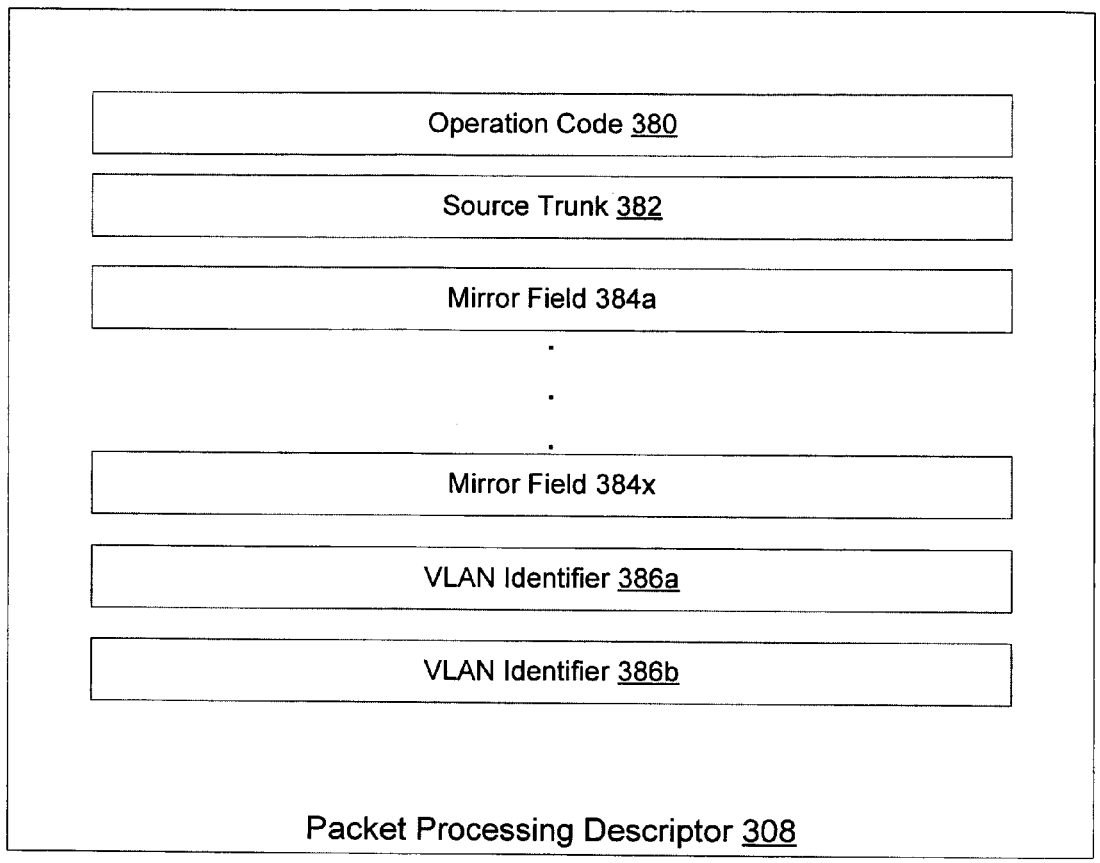
FIG. 3b illustrates one embodiment of a packet processing descriptor 308.

FIG. 3*b* illustrates one embodiment of packet processing descriptor 308. The content of packet processing descriptor 308 fields may vary depending on packet processing flow definitions. In an embodiment of the invention, different packet processing descriptor 308 overlays may be active simultaneously over a high speed link 101 and differentiated by packet processing descriptor type 366. As shown, packet processing descriptor 308 includes an operation code 380 for indicating the operation type for the next hop module, a source trunk 382 for indicating whether the source port is a member of a trunk group, multiple mirror fields 384*a*-384*x*, multiple VLAN identifiers 386*a*-386*b* and multiple reserved fields that are placed between other fields of packet processing descriptor 308.

Figure 3C:
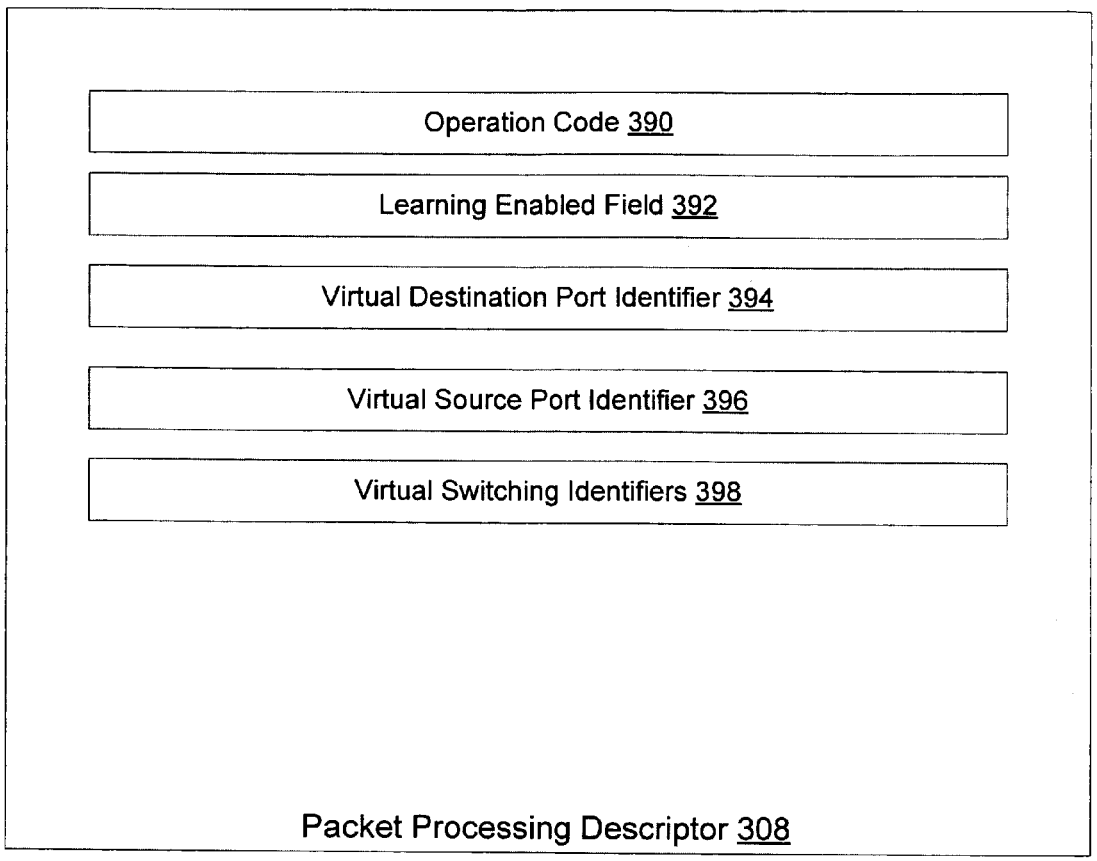
FIG. 3c illustrates another embodiment of a packet processing descriptor 308.

FIG. 3*c* illustrates another embodiment of packet processing descriptor 308. As shown, this embodiment of packet processing descriptor 308 includes an operation code 390 for indicating the packet processing instructions, a learning enable field 392 for indicating whether the peer module(s) should learn the MAC source address, a virtual destination port identifier 394 for indicating a destination virtual tunnel through which the packet is delivered to the network, a virtual source port identifier 396 for indicating a source virtual tunnel through which the packet is received from the networks, multiple virtual switching identifiers 398 for indicating the packet switching domain and flow classification information which is used to guide switching operations and multiple reserved fields that are placed between other fields of packet processing descriptor 308. In this embodiment, a physical port is used to indicate the physical network media interface, for example, SGM11 or XAU1 interface. A logical port is used to indicate the logical network media interface, for example, a SONET channel, a WiFi RF channel or a trunk. A virtual tunnel indicates the logical peer-to-peer link across a network path and a virtual switching domain indicates a logical switching plane over which the corresponding policy based switching rules could be applied regarding network scope, route selection, quality of service policy, etc.

The inventive high speed transmission protocol provides an in-band messaging mechanism among devices 102-108 for efficient and responsive traffic management and fabric operation within high quality packet switching system 100. Therefore, messages implementing the high speed transmission protocol may be defined for congestion management protocols, system resiliency protocols, database synchronization protocols and component access protocols. Each high speed message includes a control character, fixed-size message content, and an error correction field. A high speed message may be transmitted over high speed link 101 alone, or it may be inserted in the middle of a high speed packet transmission. As such, the inventive high speed transmission protocol enables pre-emptive transmission.

Figure 4:
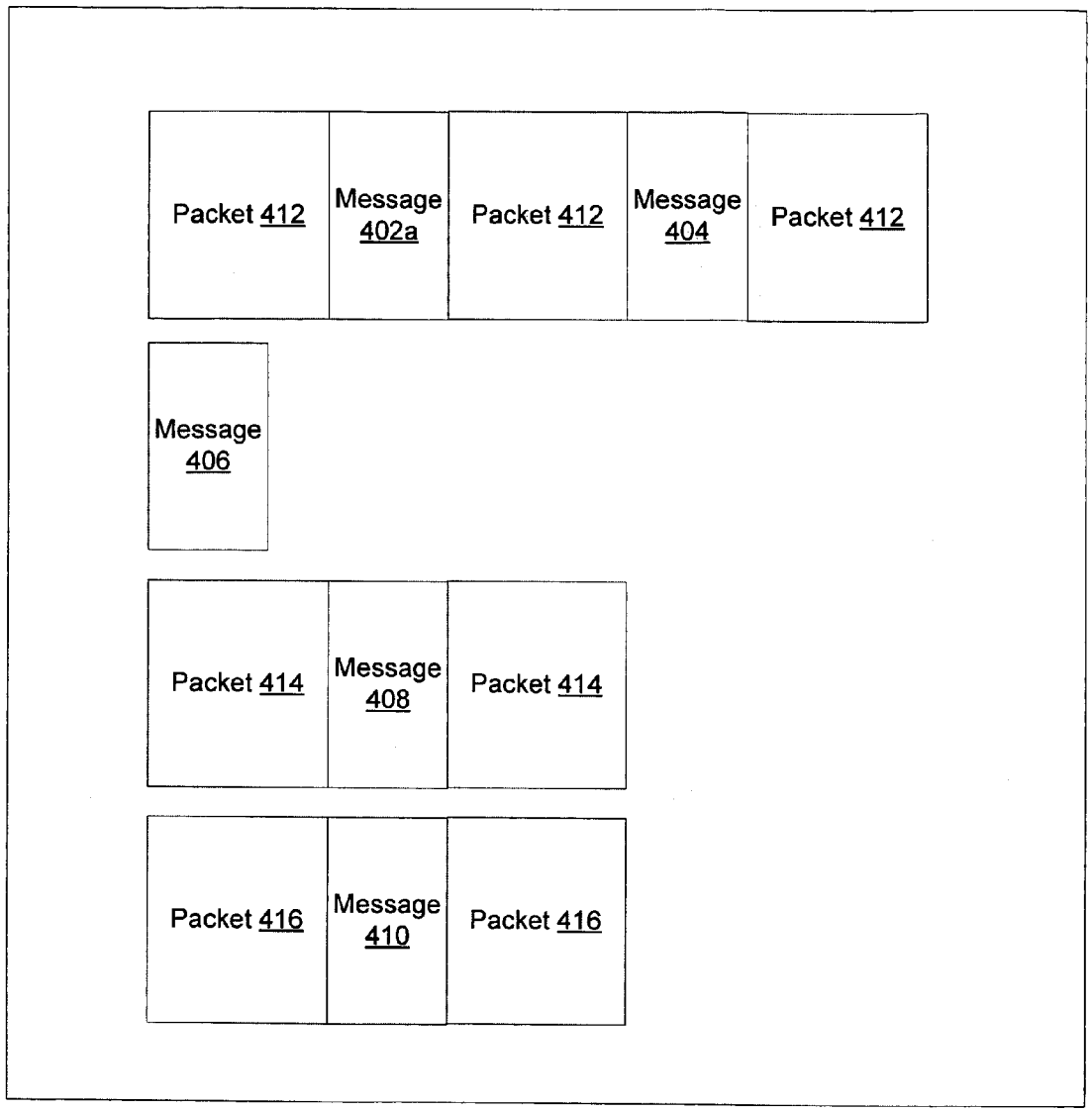
FIG. 4 illustrates an embodiment implementing pre-emptive transmission in which in-band messages are transmitted with and among multiple packets over a high speed link.

FIG. 4 illustrates an embodiment implementing pre-emptive transmission in which in-band messages are transmitted with and among multiple packets over high speed link 101. Messages 402a and 404 are transmitted with packet 412, message 406 is transmitted between packet 412 and 414, message 408 is transmitted with packet 414 and message 410 is transmitted with packet 416. For intra-packet message transmission, for example messages 402a, 404, 408 and 410, the message insertion points within a packet transmission are implementation dependent. However, in an embodiment, messages 402a, 404, 408 and 410 are inserted at the boundary of integer number of 16 bytes of the packet transmission, relative to the control start-of-packet character 302 transmission. In an embodiment, for inter-packet and intra packet message insertion, back-to-back message transmission, with no idle bytes between messages, are allowed. However, the maximum message burst size is system implementation dependent. According to the invention, the in-band messaging protocols are designed so that the frequency of message transmission do not occupy a substantial amount of link bandwidth resources, such that the regular data packet switching throughput performance is not affected. The maximum number of message insertions for intra-packet transmission may also be limited to the physical design specifications of the switching system.

Figure 4A:
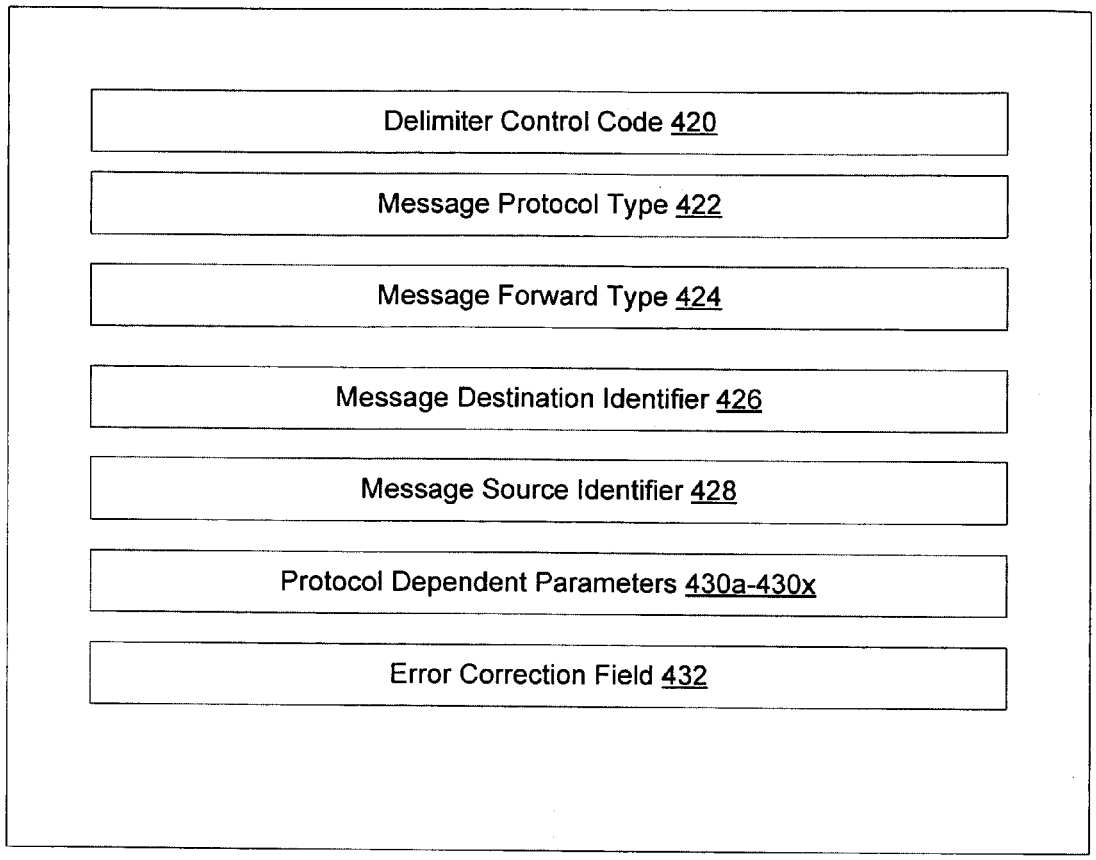
FIG. 4a illustrates the general format of each high speed transmission protocol message.

FIG. 4a illustrates the general format of each high speed transmission protocol message. Each message includes a delimiter control code 420 to indicate the start of a message transmission, a message protocol type 422, a message forward type 424, a message destination identifier 426, a message source identifier 428, multiple protocol dependent parameters 430a-430x, and an error correction field 432. An embodiment of the invention includes link level messages, egress-to-egress/end-to-end messages and module register/table access messages. The link level messages may be used for sending management commands. Egress-to-egress message are initiated from a high speed component 102-108 and terminated by the high speed module peer(s) 102-108. Module register/table access messages are designed for a CPU entity associated with module 102-108 to access the registers and tables in other modules 102-108 across switching fabric 100 through the in-band messaging mechanism.

The link level messages are initiated/terminated by the Medium Access Control (MAC) of client peers on both sides of a high speed transmission protocol physical or logical link, which may span one or more physical links. The high speed logical link is a virtual connection between multiple high speed client peers 102-108. The definition and granularity of the logical link may be system design specific, depending on attributes such as, link traffic classes, sources, destinations or various combinations thereof. Some system designs may require a conversion between a high speed physical link and a non-high speed physical link. Depending on the application, the high speed logical links may be mapped to the physical channels on a one-to-one or many-to-one basis and may be terminated at or tunnelled through the conversion devices, which require the physical channel emulation over the high speed physical link in addition to the logical link behaviour.

Figure 4B:
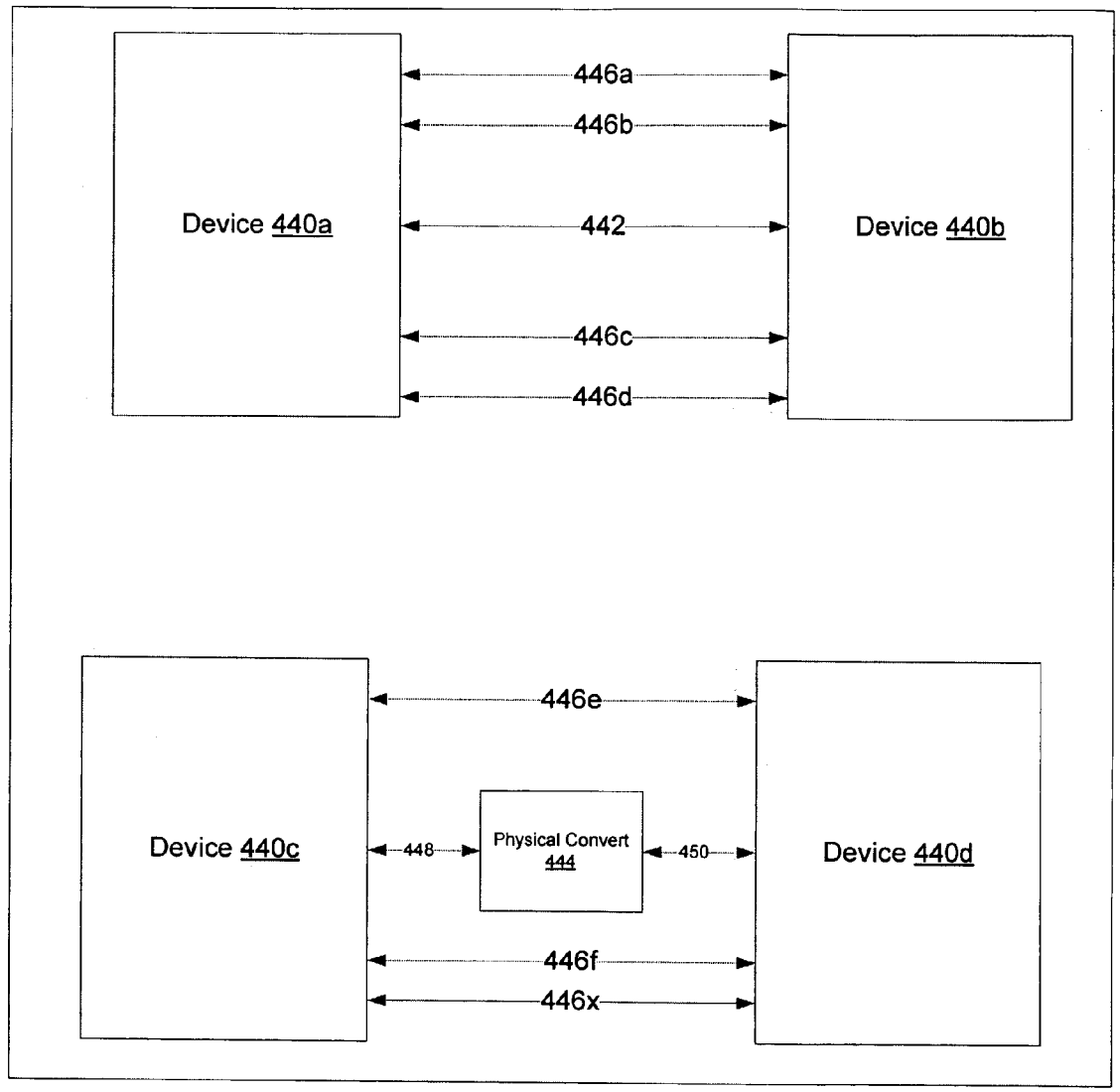
FIG. 4b illustrates multiple devices which initiate/terminate link level messages.

FIG. 4b illustrates multiple device 440a-440d (which may include one or more of devices 102-108) which initiate/terminate link level messages. Device 440a and device 440b initiate/terminate link level messages 442. Device 440c initiates/terminates link level messages 448 to physical link converter 444 which converts the high speed message to messages 450 for a non high speed MAC on device 440d and initiates/terminates messages 450 to the non high speed MAC on device 440d. Each of device 440a-440d also transmits link level messages on high speed logical links 446a-446x.

Figure 4C:
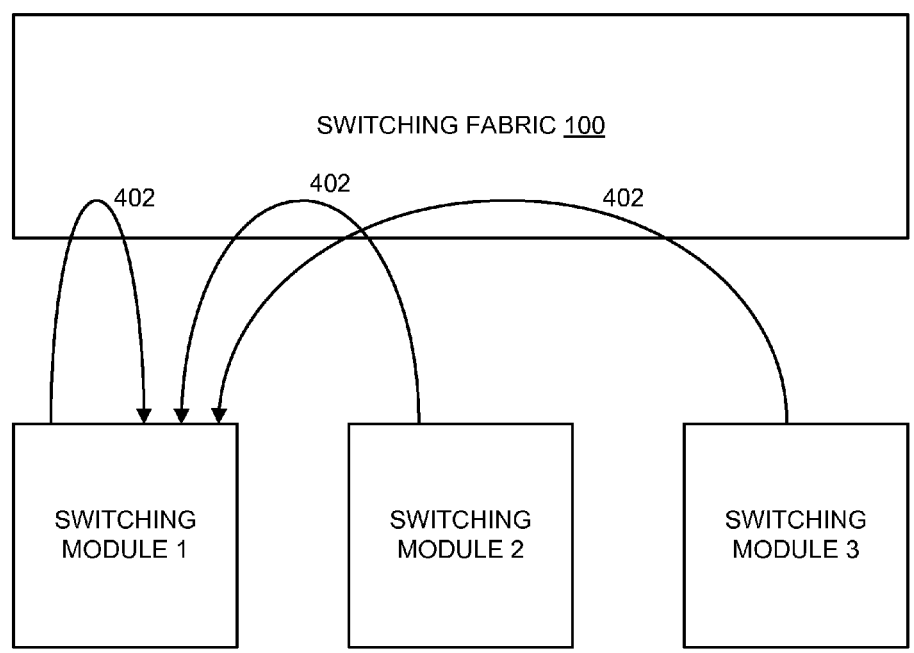
FIG. 4c illustrates an embodiment of a switching network in which end-to-end messages are transmitted.

Egress-to-egress message are initiated from high speed components 102-108 and terminated by high speed module peer(s) 102-108 across switching fabric 100. The message peer definition, message distribution pattern and message transmission quality of service may vary depending on the protocol and system design. FIG. 4c illustrates an embodiment of the switching network in which end-to-end messages are transmitted. FIG. 4c illustrates egress-to-egress messaging designed for traffic manager 104 module to module level transmission flow control at various granularities. FIG. 4c illustrates 3 switching modules, each with one or more traffic managers 104 and other devices. Depending on the egress-to-egress flow control protocols, messages may be distributed on a one-to-one or one to all basis. Line 402 represents a one-to-one logical tunnel, i.e., from one traffic manager 104 in module 1 to another traffic manager 104 in module 1, from one traffic manager in module 2 to a traffic manager in module 1 and from one traffic manager in module 3 to another traffic manager in module 1. Line 404 represents the all-to-one logical tunnel, i.e., all modules to module 1. Based on the congestion status changes on tunnels to module 1, module 1 may deliver the corresponding flow control message to all modules to regulate the corresponding traffic.

Figure 4D:
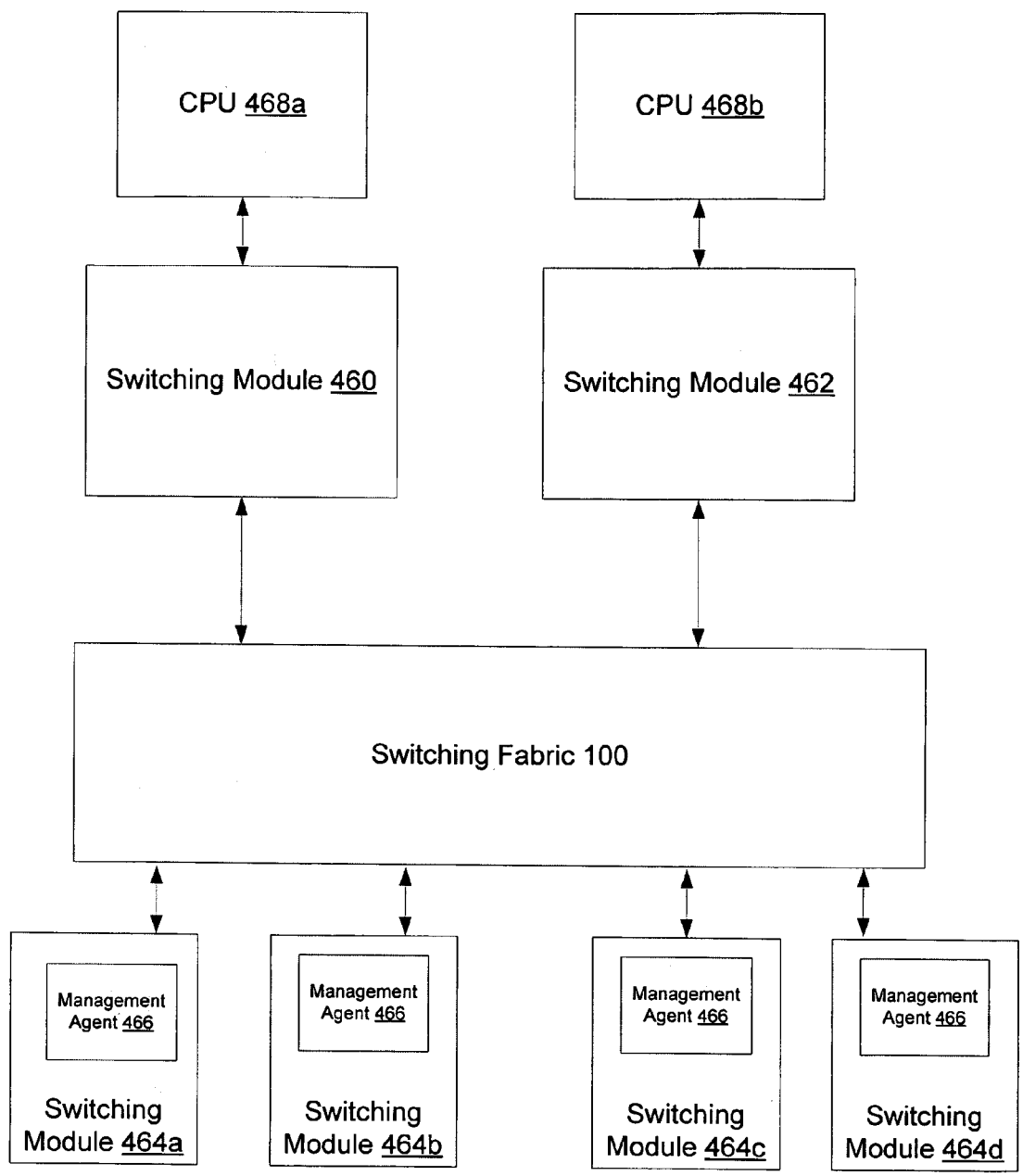
FIG. 4d illustrates an embodiment of a network implementing module register/table access messaging.

FIG. 4d illustrates an embodiment of a network implementing module register/table access messaging. As shown in FIG. 4d, each of modules 460 and 462 is associated with a CPU 468a/b through a regular PCI connection and packaged in the format of a management card in a chassis system. Each of modules 464a-464d has no associated CPU entities and are packaged in the form of line cards. Each of modules 460-464 has it associated management agent logic block 466 to execute the register/table access commands from a CPU entity 468 and responds with the results back to the corresponding CPU entity 468. In an embodiment, the message delivery is restricted to peer-to-peer (unicast) only between a CPU entity 468 and a management agent 466 within a module. In an embodiment, the peer-to-peers (multicast) messaging between a CPU entity 468 and the management agent 466 of multiple modules and the peer-to-peer messaging among multiple CPU entities are defined as separate protocols.

Figure 5:
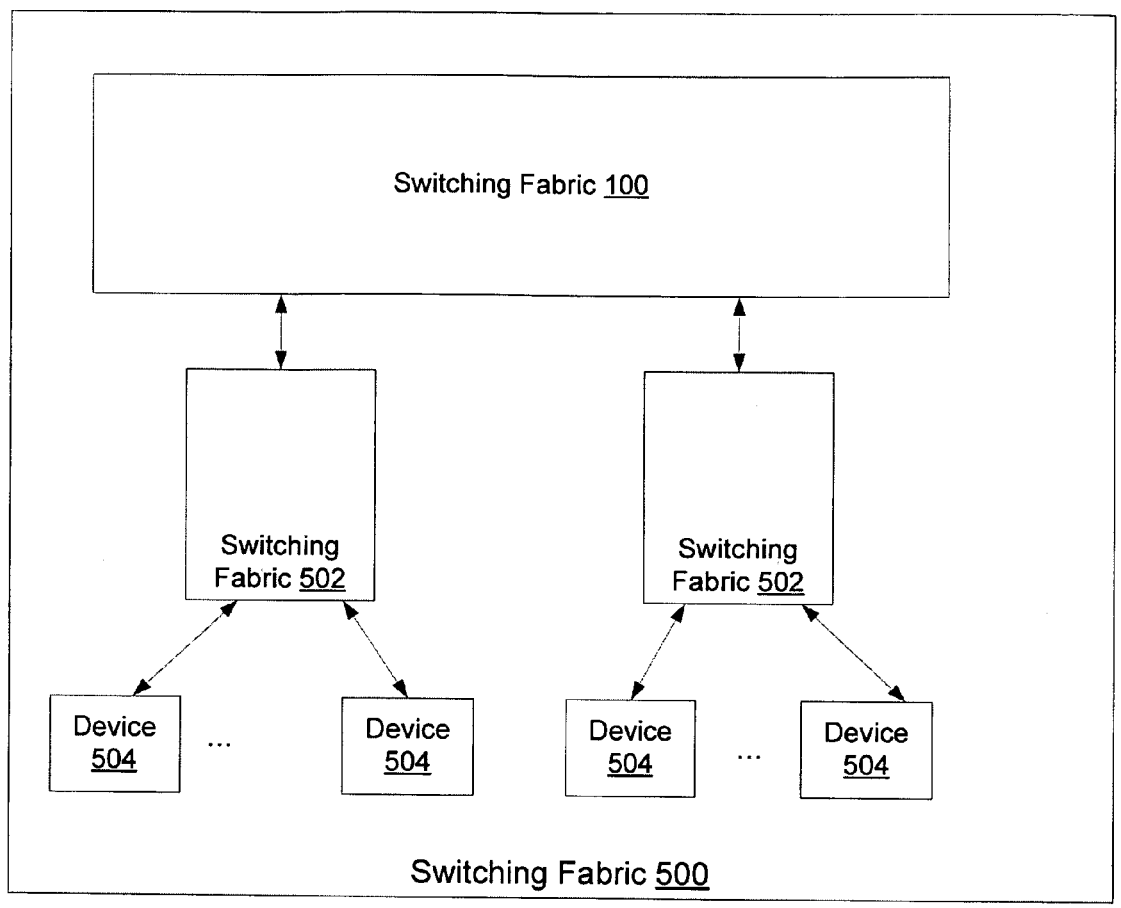
FIG. 5 illustrates an embodiment of the invention in which a switching fabric includes multiple switching fabrics and multiple devices.

According to an embodiment of the invention, multiple switching modules implementing the inventive high speed transmission protocol, may be implemented with multiple devices without the inventive high speed transmission protocol, wherein the functionality of the switching modules implementing the high speed transmission protocol is extended to the devices not implementing the high speed transmission protocol. FIG. 5 illustrates an embodiment of the invention in which a system 500 includes the inventive switching fabric 100, multiple switching modules 502 implementing the inventive high speed transmission protocol and multiple devices 504 without the inventive high speed transmission protocol. Therefore, the switching functions supported by each device 504 are a subset of those supported by switching modules 502. However, this embodiment extends the functionalities of switching modules 502 to associated devices 504 without increasing the overall system cost. For example, this embodiment enables the removal of a CPU subsystem on each device 504, thereby decreasing both the cost and complexity of the system design. System level switching delays could also be reduced in this embodiment of the invention.

Each of switching modules 502 serves as a master entity and each of devices 504 serves as a slave entity for its associated switching module 502. This allows for in-band messaging, register access and interrupt messages. System 500 also supports in-band link level flow control messages. Each of devices 504 supports a IGE wire-speed transmission capability and switching modules 502 support 64 logical channels (64 port slave designs) per 1 GE uplink for both ingress and egress directions. In this embodiment, switching modules 502 perform all switching functions including packet forwarding and filtering, packet modification and replication, switching protocol implementation and database management, switching level MIB collection and congestion control and traffic scheduling/shaping. Devices 504 perform MAC function and data-path multiplexing/de-multiplexing functions including MAC transmission and flow control operations, MAC/port level MIB collection, bandwidth oversubscription congestion management, and traffic policing/metering. In an embodiment of the invention, local switching capability is not required of device 504.

When a packet enters the system, ingress device 504 transmits the user port on which the packet is received and the class of service to which the packet belongs to an associated switching module 502. When a class of service becomes congested, switching module 502 transmits information about the congested class of service to associated device 504. After the packet is processed, switching module 502 transmits the user port on which the packet should be transmitted to egress device 504 and egress device 504 transmits information about congested user ports to the associated switching module 502. To perform management functions, switching modules 502 send requests for information about registers to access for read/write operations and devices 504 return associated register access responses. Each device 504 also transmits status change interrupts to switching modules 502.

Because each device 504 supports only a IGE MAC, the present invention limits the number of fields transmitted in each packet/message. As such, in this embodiment, the header of each packet is condensed from 16 bytes to 8 bytes. A header of a packet/message transmitted through system 500 includes a start of logical link delimiter field, a type field which indicates the packet or control message, a destination identifier for indicating the destination virtual port, a source identifier for indicating a source virtual port, drop precedence field for indicating the drop precedence marking of the packet on ingress, an error field for indicating whether the packet is received with an error on ingress and a traffic class field for indicating the traffic class to which the packet belongs. The header also includes an error correction field which covers from the start of logical link delimiter field to the source identifier. The packet includes a payload, for example an Ethernet payload, which carries the variable sized packet content starting from the MAC destination address through the error correction fields. The payload may also be a fixed sized message content which includes error correction fields.

In another embodiment of the invention, multiple devices 504 are stackable in a closed/opened ring topology to perform as a single unit. This embodiment allows for in-band messaging for flow control across a virtual "full mesh network." This embodiment also allows for in-band messaging, system management and switching database synchronization. Devices 504 may be stacked in a symmetrical network module, wherein each device 504 of a stack is a standalone switch and a stacking port is treated as just one of the network ports. This allows for minimum stacking header. Devices 504 may also be stacked in an asymmetrical fabric module, wherein each device functions as a combination of ingress-packet processor 106 and egress-packet processor 106 and a stacking port are treated as a fabric link. However, it should be noted that a 1GE uplink may not be fast and robust enough to serve as a fabric link. This embodiment of the invention allows for a stacking header to carry additional packet processor index information from the ingress device to the egress devices. It should be noted that local switching capability is independent of the stacking design model.

Figure 6:
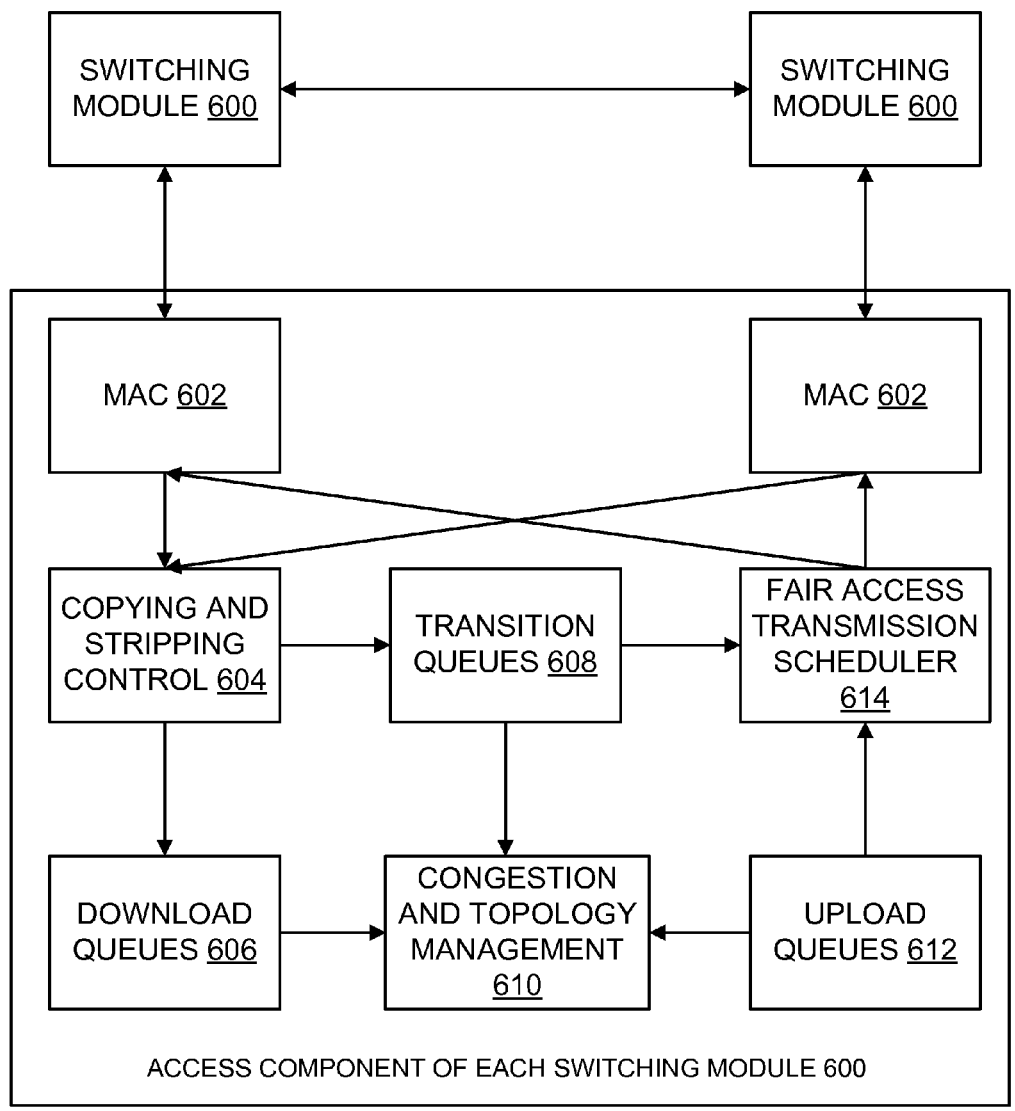
FIG. 6 illustrates an access component of each of the switching modules in a ring topology.

According to another embodiment of the invention, multiple switching modules 102-108 with up to 10GE wire-speed transmission capability are implemented in an Ethernet ring topology, wherein the MAC layer is modified in a manner that is transparent to software L2/L3 switching modules. FIG. 6 illustrates an access component 600 of each switching module 102-108 implemented in the Ethernet ring topology. As shown, each switching module 102-108 includes dual MAC interfaces 602 that are considered as a single trunk interface to the network media. Each MAC interface 602 handles encapsulation and error control for packet transmission. Each switching fabric also includes a copying and stripping control component 604, download queues 606, transition queues 608, congestion and topology management entity 610, upload queues 612, and a fair access transmission scheduler 614. Copying and stripping control component 604 filters received packets for packet downloading and transition forwarding. Download queues 606 queue ingress packets to be processed by a L2/L3 switching entity. Congestion and topology management entity 610 handles protocols on ring congestion and flow control and ring topology configuration and status change notification. Upload queues 612 queue egress packets from the L2/L3 switching entity and fair access transmission scheduler 614 handles arbitration between uploading and transitional packets and steer packets between dual MAC interfaces 602. The inventive Ethernet ring topology 600 offers resiliency and fairness with minimal cost increase and modification over a standard Ethernet interface.

Based on packet flow hashing, each switching module 102-108 randomly selects a direction on one of dual MAC interfaces 602 on which to transmit each packet. Hence, although the L2/L3 switching entity hashes packet flows among the two interfaces 602, it is agnostic to the ring behaviour of this embodiment. For peer-to-peer (unicast) forwarding, there is a full-duplex logical link between every pair of ring switching fabric peers, where the customer MAC/VLAN address learning is associated with the logical link. For peer-to-peer multicast forwarding, there is a multi-drop logical link from a ring switching module to all of its ring switching fabric peers, where tree-pruning is performed at the L2/L3 switching level.

Specifically, for peer-to-peer (unicast) forwarding, the L2/L3 switching entity of an originating switching module 600 decides to forward a packet to another switching module 600 on the ring and hashes to determine the packet direction on one of interfaces 602. The originating switching fabric then transmits the packet to the destination switching module through intermediate switching modules. Each of the intermediate switching modules 600 passes the packet to the next switching module 600 in the transmission path without copying or stripping the packet from the ring. When the packet reaches its destination, the destination switching module 600 strips the packet from the ring and copies the packet to its L2/L3 switching entity which switching the packet to one of its destination customer ports and learns the source customer MAC/VLAN address with the originating switching module. If during transmission of the packet, one of the intermediate switching modules 600 malfunctions, the originating switching fabric re-steers the packet through its other MAC interface 602 to the destination switching module 600.

For peer-to-peer multicast forwarding, the L2/L3 switching entity of a switching module decides to multicast a packet, hashes the packet to determine the packet direction on one of the two interfaces 602 and sends the packet as a multicast packet. Each switching module receiving the packet copies the packet to its L2/L3 switching entity for further switching to their customer port(s) and source customer and performs MAC/VLAN learning with the originating switching module, without stripping the packet off the ring. Thereafter, the final receiving switching module or the originating switching module strips the packet from the ring. If during transmission of the packet, one of the receiving switching modules malfunctions, the sending switching module re-steers th packet through its MAC interfaces 602.

In this embodiment, to ensure the fairness principle, for rate provisioned packet flows, local traffic uploading should be guaranteed in the presence of pass-through traffic. A congestion status is detected and advertised to all upstream switching modules when a switching module, in the ring topology, is unable to upload local traffic for a consistent period due to too much pass-through traffic. Once notified about a congestion station, each upstream switching module reduces its upload shaping rate accordingly so that the congested switching module has a chance to upload its traffic. As an optimization point, traffic to the switching modules prior to the congested switching module is not affected unless a prior congestion point is detected.

Every switching fabric on the ring is assigned a unique station identifier. One embodiment of the invention allows up to 256 switching fabrics on the ring. Ethernet packet encapsulation is enhanced with explicit tag information in place of preamble fields. Specifically, the ring header structure is designed to include a start of logical link delimiter, a type field for packet/message type differentiation, a multicast indication, a next hop count for ring transmission scope limiting, a destination switching fabric identifier for packet/message target(s) identification, a source switching fabric identifier for packet/message originator identification and an error correction field. Multiple virtual MAC service interfaces are presented to the MAC client layer. In an embodiment, up to 256 virtual unicast MACs and one multicast MAC is present at each MAC instance. Each virtual unicast MAC presents a dedicated flow control interface to the MAC client layer through the corresponding MAC control sub-layer. Traffic flows on the ring are divided into rate provisioned and non-rate provisioned. For rate provisioned traffic flows the rate is reserved over every link along the path from a source switching fabric to a destination switching fabric. For example, control messages are considered rate provisioned. For non-rate provisioned traffic flows the rate is not reserved across the ring path. The rate traffic is regulated automatically through flow control mechanisms designed for fair access of the ring bandwidth left over by the rate provisioned traffic.

With respect to the present invention, network devices may be any device that utilizes network data, and can include switches, routers, bridges, gateways or servers. In addition, while the above discussion specifically mentions the handling of packets, packets, in the context of the instant application, can include any sort of datagrams, data packets and cells, or any type of data exchanged between network devices.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for implementing a high speed transmission protocol, the network device comprising:
   a plurality of high speed modules which are connected by a plurality of high speed links, each of the plurality of high speed modules implementing the high speed transmission protocol and each of the plurality of high speed modules being implemented in an Ethernet ring topology,
   wherein a medium access control layer in each of the plurality of high speed modules is modified such that the medium access control layer is configured to separately queue (i) packets communicated between the high speed modules of the Ethernet ring, (ii) packets entering the Ethernet ring and (iii) packets leaving the Ethernet ring, wherein the modification is transparent to a switching entity in each of the plurality of high speed modules and the medium access control layer is configured to communicate packets from at least two of the separate queues over a same high speed link, and
   the high speed transmission protocol comprises a plurality of aspects including an in-band messaging mechanism for efficient and responsive traffic management and network operation.

2. The network device according to claim 1, wherein each of the plurality of high speed modules is configured to include an access component comprising:
   a dual medium access control interface configured as a single trunk interface to a network media;
   a copying and striping control component configured to filter received packets for downloading and transition forwarding;
   a plurality of download queues configured to queue the packets leaving the Ethernet ring that are to be processed by the switching entity;
   a plurality of transition queues configured to queue the packets communicated between the high speed modules of the Ethernet ring;
   a congestion and topology management entity for handling protocols on ring congestion and flow control and ring topology configuration and status change notification;

a plurality of upload queues configured to queue the packets entering the Ethernet ring that are received from the switching entity; and a fair access transmission scheduler for handling arbitration between uploading and transitional packets and for steering packets between the dual medium access control interface.

3. The network device according to claim 2, wherein the dual medium access control interface in each of the plurality of high speed modules is configured to handle encapsulation and error control for packet transmission.

4. The network device according to claim 2, wherein each of the plurality of high speed modules is configured to randomly select a direction on the dual medium access control interface on which to transmit a packet.

5. The network device according to claim 1, wherein the network device is configured for unicast forwarding such that there is a full-duplex logical link between every pair of ring switching peers.

6. The network device according to claim 1, wherein the network device is configured for multicast forwarding such that there is a multi-drop link for a ring switching module to all of associated ring switching module peers.

7. The network device according to claim 1, wherein the network device is configured for rate-provisioned packet flows, such that local traffic uploading is guaranteed in the presence of pass-through traffic.

8. The network device according to claim 1, wherein the network device is configured such that congestion status is detected and advertised to all upstream high speed modules when one of the plurality of high speed modules is unable to upload local traffic for a consistent period due to pass-through traffic.

9. The network device according to claim 1, wherein the network device is configured to assign a unique station identifier to each of the plurality of high speed modules.

10. The network device according to claim 1, wherein the network device is configured such that Ethernet packet encapsulation is enhanced with explicit tag information in place of preamble fields.

11. A high speed module implementing a high speed transmission protocol in a network device, the module comprising:
means for connecting to a plurality of high speed modules by a plurality of high speed links, each of the high speed modules being implemented in an Ethernet ring topology; and
means for modifying a medium access control layer such that the medium access control layer is configured to separately queue (i) packets communicated between the high speed modules of the Ethernet ring, (ii) packets entering the Ethernet ring and (iii) packets leaving the Ethernet ring, wherein the modification is transparent to a switching entity in each of the plurality of high speed modules and the medium access control layer is configured to communicate packets from at least two of the separate queues over a same high speed link,
wherein the high speed transmission protocol comprises a plurality of aspects including an in-band messaging mechanism for efficient and responsive traffic management and network operation.

12. The module according to claim 11, wherein each of the high speed modules is configured to include an access component comprising:
a dual medium access control interface configured as a single trunk interface to a network media;
a copying and striping control component configured to filter received packets for downloading and transition forwarding;
a plurality of download queues configured to queue the packets leaving the Ethernet ring that are to be processed by the switching entity;
a plurality of transition queues configured to queue the packets communicated between the high speed modules of the Ethernet ring;
a congestion and topology management entity configured to handle protocols on ring congestion and flow control and ring topology configuration and status change notification;
a plurality of upload queues configured to queue the packets entering the Ethernet ring that are received from the switching entity; and
a fair access transmission scheduler configured to handle arbitration between uploading and transitional packets and for steering packets between the dual medium access control interface.

13. The module according to claim 12, wherein the dual medium access control interface in each of the high speed modules is configured to handle encapsulation and error control for packet transmission.

14. The module according to claim 12, wherein each of the high speed modules is configured to randomly select a direction on the dual medium access control interface on which to transmit a packet.

15. The module according to claim 11, wherein the module is configured for rate-provisioned packet flows, such that local traffic uploading is guaranteed in the presence of pass-through traffic.

16. The module according to claim 11, wherein the module is configured such that congestion status is detected and advertised to all upstream high speed modules when one of the plurality of high speed modules is unable to upload local traffic for a consistent period due to pass-through traffic.

17. The module according to claim 11, wherein the module is configured to assign a unique station identifier to each of the high speed modules.

18. The module according to claim 11, wherein the module is configured such that Ethernet packet encapsulation is enhanced with explicit tag information in place of preamble fields.

19. A method for implementing a high speed transmission protocol in a network device, the method comprising:
connecting to a plurality of high speed modules by a plurality of high speed links, each of the high speed modules being implemented in an Ethernet ring topology; and
modifying a medium access control layer of each of the high speed modules such that the medium access control layer is configured to separately queue (i) packets communicated between the high speed modules of the Ethernet ring, (ii) packets entering the Ethernet ring and (iii) packets leaving the Ethernet ring, wherein the modification is transparent to a switching entity in each of the plurality of high speed modules and the medium access control layer is configured to communicate packets from at least two of the separate queues over a same high speed link,
wherein the high speed transmission protocol comprises a plurality of aspects including an in-band messaging mechanism for efficient and responsive traffic management and network operation.

* * * * *